Patented Jan. 7, 1936

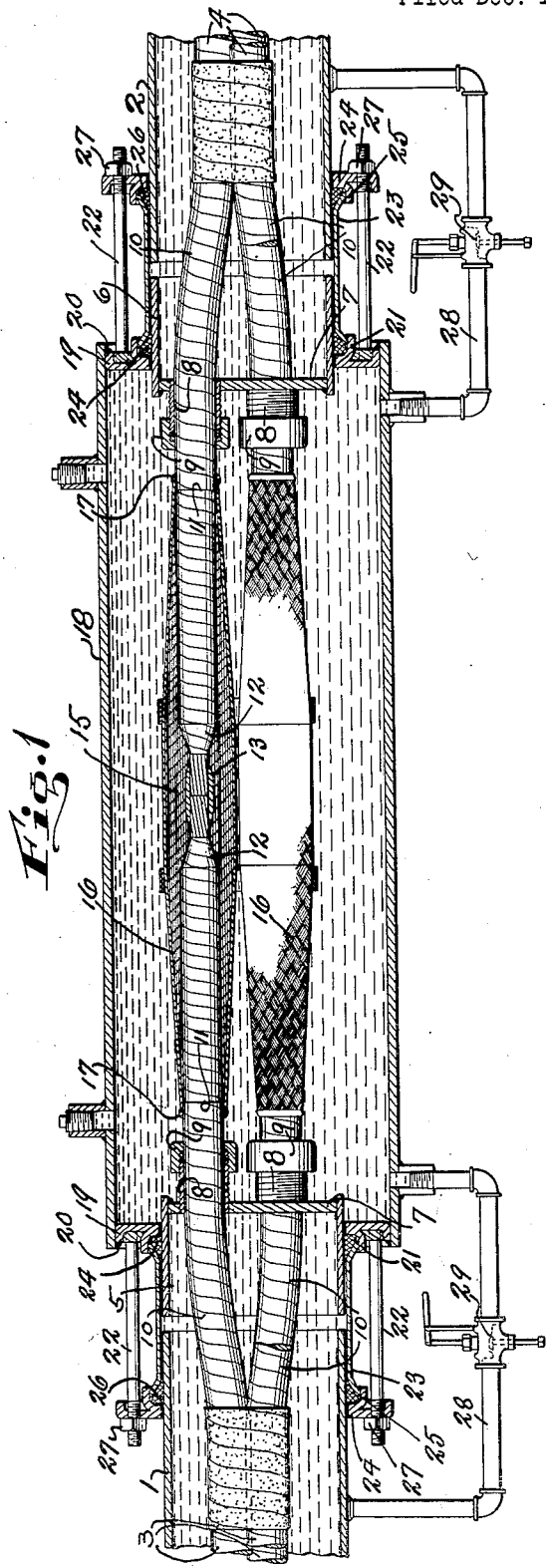

2,026,587

UNITED STATES PATENT OFFICE 2,026,587

JOINT FOR ELECTRIC CABLES

Fred C. Meyer, Paterson, and George E. Moffitt, East Paterson, N. J., assignors to The Okonite-Callender Cable Company, Incorporated, Paterson, N. J., a corporation of New Jersey Application December 10, 1932, Serial No. 646,593

3 Claims. (Cl. 247—3)

This invention relates to an improvement in joints for electric cables and is particularly directed to joints for cables of the pressure type, that is to say, where the insulated conductors of the cable are laid in pipes, maintained filled with oil or other insulating fluid under pressure.

In the drawing accompanying this application:

Fig. 1 is a longitudinal section of a semi-stop joint; and

Fig. 2 is a similar view of a through joint.

Referring first of all to the embodiment of our invention shown in Fig. 1, the pipes for the cables are designated 1 and 2, the insulated cable conductors to be joined being designated 3 and 4, respectively. For purposes of illustration only a three conductor cable has been shown.

Aligned with the cable pipes 1 and 2, respectively, are joint sleeves 5 and 6 of the same internal and outside diameter as the pipes 1 and 2, each of these sleeves at its forward end, i. e., the end remote from the pipes 1 and 2 being provided with an end or barrier plate 7 welded to the sleeve. Screwed into each of these end plates 7 are thimbles 8, a thimble for each cable conductor. Each thimble 8 is capped by a cap 9.

The insulation of each cable conductor is covered with a metal tape 10 terminated at 11. Each conductor is threaded through a thimble 8, pencilled at 12 and the bared conductors joined by a connector 13 or other suitable connection or splice.

About the joint or splice thus provided we apply or build up a structure designated 15 of paper or varnished cambric or some such suitable insulating material, and metal shielding braid 16 is applied about the structure 15, this shielding braid being joined as shown at 17 to the metal tape 10 of the spliced conductors.

18 designates the casing of the joint and each end of this casing, as will be seen from Fig. 1, is provided with an annulus or ring 19 welded thereto as indicated at 20. Each ring or annulus 19 is provided with a flange 21 extending outwardly of the casing 18.

Permanently secured to the annulus or ring 19 are bolts 22.

Surrounding the adjacent ends of the pipe 1 and sleeve 5 is a sleeve 23, a similar coupling sleeve being provided at the other end of the joint. The ends of these sleeves are flared outwardly and the inner end of each sleeve underlies the flange 21 on the annulus 19, packing 24 being provided intermediate the flared ends of these sleeves and the annulus or ring 19.

Carried by each of the pipes 1 and 2 is a ring 24, these rings which are quite similar to the rings 19 having a flange 25 facing the flange 21 on the rings 19. The outer end of each of the sleeves 23 is flared outwardly and underlies the flanges 25, packing 26 being provided between the outer ends of these sleeves and these flanges. The bolts 22, above referred to, extend through the rings 24 and when the nuts 27 are set up a liquid tight union will be provided between the pipes 1 and 2 and sleeves 5 and 6, respectively.

The interior of the joint casing 18 is always in communication with the interior of the cable pipes or conduits 1 and 2 through pipe lines 28, equipped with automatic shut off valves 29, the interior of the joint thus being maintained at the high pressure at which the insulating fluid in the pipes 1 and 2 is carried.

In the embodiment of our invention illustrated in Fig. 2 we show a through joint as distinguished from the semi-stop joint of Fig. 1. In this embodiment of our invention, 1' and 2' designate the pipes for the conductors 3' and 4'.

18' designates the casing of the joint and this casing is equipped adjacent each end with an outwardly extending flange 30, these flanges being welded to the casing. Each flange is equipped with bolts 31.

Surrounding the cable pipes 1' and 2' are rings 24', each provided with a flange 25' extending forwardly toward the joint. The outer ends of the casing 18 which are flared outwardly slightly underlie these flanges 25', packing 26' being provided between these flared ends of the casing 18' and the pipes 1' and 2' so that when the nuts 32 on the bolts 31 are set up a fluid-tight connection will be provided between the casing 18' and the cable pipes 1' and 2'.

Internally of the joint the cable conductors are joined in the same fashion as set out in connection with Fig. 1.

A block of wood 33 or other suitable material underlies the insulated cable conductors adjacent the ends of the pipes 1' and 2' for spacing the conductors from the bottom of the pipes.

What we claim is:—

1. A joint for high tension electric cables of the type in which the insulated cable conductors are laid in a pipe filled with oil under high pressure in which the conductors and their insulation are submerged, comprising in combination an enclosing joint casing, joint sleeves aligned with the adjacent ends of the cable pipes, a barrier plate attached to the inner end of each joint sleeve, thimbles in said barrier plates for receiving and supporting the insulated cable conductors which are to be joined within said casing, a coupling sleeve at each end of the joint surrounding the ajacent ends of said joint sleeves and cable pipes, said joint casing overlapping the said joint sleeves, a ring attached to each end of the joint casing, a ring on each cable pipe and movable longitudinally thereof, packing intermediate the ends of the coupling sleeves and said rings, and bolts for drawing the pipe rings and coupling sleeves toward the joint casing rings to provide a fluid tight connection between the cable pipes and the said joint sleeves.

2. A joint for high tension electric cables of the type in which the insulated cable conductors are laid in a pipe filled with oil under high pressure in which the conductors and their insulation are submerged, comprising in combination an enclosing joint casing, rings at each end of the joint casing and welded thereto, joint sleeves surrounded by said rings and aligned with the adjacent ends of the cable pipes, coupling sleeves at each end of the joint and surrounding the cable pipes and the said joint sleeves, rings carried by the cable pipes and movable longitudinally thereof, the ends of each of said coupling sleeves being flared outwardly, packing between the flared sleeve ends and the joint casing rings and the cable pipe rings, and bolts connecting the joint casing rings and the cable pipe rings for compressing said packing to provide a fluid tight connection between the joint casing and cable pipes.

3. A joint for high tension electric cables of the type in which the insulated cable conductors are laid in a pipe filled with oil under high pressure in which the conductors and their insulation are submerged, comprising in combination, an enclosing joint casing, joint sleeves aligned with the adjacent ends of the cable pipes, a barrier plate attached to the inner end of each joint sleeve, thimbles in said barrier plates for receiving and supporting the insulated cable conductors which are to be joined within said casing, a coupling sleeve at each end of the joint surrounding the adjacent ends of said joint sleeves and cable pipes, said joint casing overlapping the said joint sleeves, a ring attached to each end of the joint casing, a ring on each cable pipe and movable longitudinally thereof, packing intermediate the ends of the coupling sleeves and said rings, bolts for drawing the pipe rings and coupling sleeves toward the joint casing rings to provide a fluid-tight connection between the cable pipes and the said joint sleeves, a pipe at each end of the joint casing for maintaining communication between the joint casing and the cable pipe, and an automatic shut-off valve in each of said pipes.

FRED C. MEYER.
GEORGE E. MOFFITT.